United States Patent [19]

Hengel et al.

[11] Patent Number: 4,539,956
[45] Date of Patent: Sep. 10, 1985

[54] DIESEL FUEL INJECTION PUMP WITH ADAPTIVE TORQUE BALANCE CONTROL

[75] Inventors: James F. Hengel; Donald J. Armstrong, both of Troy; Frank Ament, Rochester; Marc B. Center, Madison Heights; John E. Ausen, Leonard, all of Mich.

[73] Assignee: General Motors Corporation, Detroit, Mich.

[21] Appl. No.: 448,311

[22] Filed: Dec. 9, 1982

[51] Int. Cl.³ .................... F02M 39/00; F02M 59/20
[52] U.S. Cl. .................................. 123/357; 123/494; 123/436; 123/458
[58] Field of Search ............... 123/494, 357, 435, 436, 123/462, 358, 359, 458; 417/462, 252, 253

[56] References Cited

U.S. PATENT DOCUMENTS

| 4,331,119 | 5/1982 | Chadwick | 123/450 |
| 4,351,283 | 9/1982 | Ament | 123/458 |
| 4,356,551 | 10/1982 | Iwase | 123/435 |
| 4,357,662 | 11/1982 | Schira | 123/436 |
| 4,393,844 | 7/1983 | Skinner | 123/450 |
| 4,406,264 | 9/1983 | Mowbray | 123/462 |

Primary Examiner—Carl Stuart Miller
Attorney, Agent, or Firm—Arthur N. Krein

[57] ABSTRACT

An otherwise conventional fuel supply system of the type that includes an engine driven distributor type fuel injection pump operatively connected to a diesel engine is modified so as to include a normally closed solenoid actuated valve means operatively associated with the inlet passage means of the pump in a location between the transfer pump of the pump and the injection pump means of the pump; an adaptive torque balancing electronic controlled electric power source being connected to the solenoid actuated valve means, whereby the solenoid actuated valve means is operative to supplement the metering valve control of fuel flow from the transfer pump to the injection pump means whereby the fuel flow to the injection pump means and from the injection pump means to each of the respective injection nozzles for each of the cylinders is controlled as a function of engine operation and the incremental speed difference per preselected degrees of movement among the respective cylinders of the engine.

5 Claims, 12 Drawing Figures

SERIES EXAMPLE: CYL 2 FAST
CYL 3 SLOW

SERIES AVE. FILL MODIFICATION PULSE WIDTH

SERIES AVE. FILL MODIFICATION
+ OR − FUEL FILL MODIFIER PULSE WIDTH

DIESEL FUEL INJECTION PUMP WITH ADAPTIVE TORQUE BALANCE CONTROL

FIELD OF THE INVENTION

This invention relates to a distributor type diesel fuel injection pump for use with a multicylinder engine and, in particular, to a such type pump that is operative to supply fuel to the respective cylinders of an engine whereby to effect substantial torque balanced output from the cylinders.

BACKGROUND DESCRIPTION

The desirability of obtaining equal torque output from each cylinder of a multi-cylinder internal combustion engine has long been recognized. For this purpose it has recently been proposed, as disclosed, for example, in the SAE Publication 820207 entitled Digital Analyzer for Internal Combustion Engines by C. K. Leung and J. J. Schira, or, as disclosed in Research Disclosure No. 18002 published in Research Disclosure, April 1979, to use engine cylinder variation to control cylinder-to-cylinder fuel distribution so as to obtain substantially equal torque contributions from each cylinder in a multi-cylinder engine.

As disclosed in these publications, for diesel engines and spark ignition engines with A/F ratios greater than 13.8, a slight increase in fuel supplied to a cylinder will increase the torque produced by that cylinder. Accordingly, the output of each cylinder is compared with the average output of all cylinders to determine the amount of correction needed for each cylinder. As an example, for this purpose engine speed variations between the individual cylinders are measured because the relative magnitudes of the individual cylinder outputs can be obtained by measuring the cylinder-to-cylinder amplitude variation of the speed variation signal. These signals are then used, as in an electronic fuel injection system of the type with an onboard computer, to control fuel flow to the respective cylinder in a manner to provide substantial equal torque output among the cylinders.

SUMMARY OF THE INVENTION

The present invention relates to a rotary distributor type fuel injection pump for use on a multi-cylinder compression ignition engine having the usual governor controlled mechanical metering valve used to regulate the flow of fuel from a transfer pump through an inlet passage to the injection pump of the unit and which, in addition, includes a normally closed solenoid actuated valve associated with the inlet passage and, an adaptive torque balancing electronic controlled electric power source connected to the solenoid actuated valve. The solenoid actuated valve is operative to supplement the metering valve control of fuel flow to the injection pump and thus the pressurized flow of fuel from the injection pump to each of the injection nozzles for the respective cylinders is controlled as a function of engine operation and the incremental speed difference per preselected degrees of movement among the respective cylinders of the engine whereby to obtain substantial balanced output from the cylinders.

Accordingly, a primary object of the invention is to provide an improved rotary distributor type fuel injection pump for use on a multicylinder engine wherein a solenoid actuated valve connected to an adaptive torque balancing electronic controlled electric power source is operative to tailor the fuel output from the injection pump so as to provide combustion control on an individual cylinder basis.

Another object of the invention is to provide means on an otherwise conventional type rotary distributor fuel injection pump as used on a multi-cylinder engine for tailoring the fuel output from the pump on a cylinder-to-cylinder basis so as to obtain substantial torque balanced output from the cylinders of the engine.

For a better understanding of the invention as well as other objects and further features thereof reference is had to the following detailed description of the invention to be read in connection with the accompanying drawings.

DESCRIPTION OF THE PREFERRED EMBODIMENTS

Figures 1, 2:
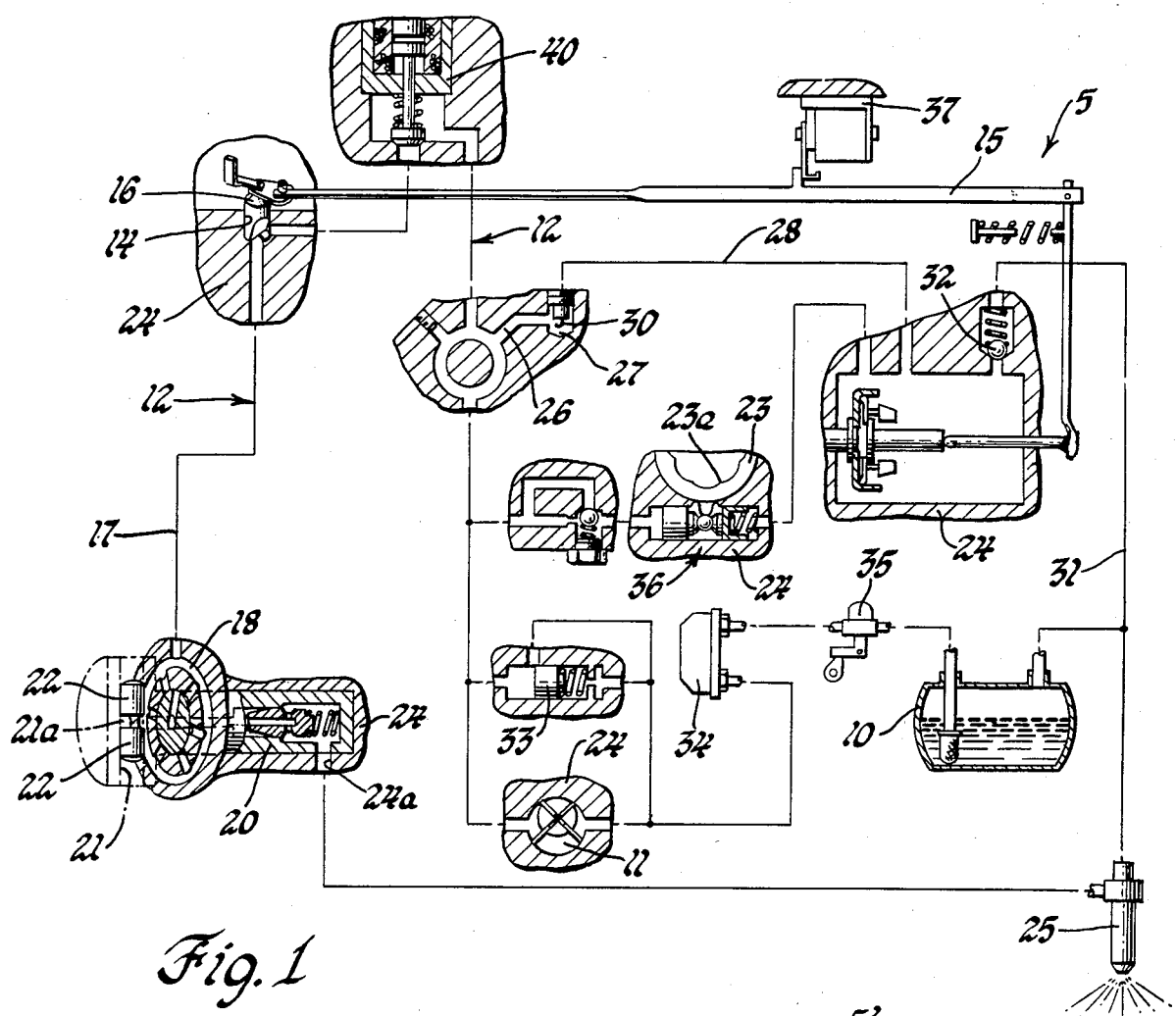
FIG. 1 is a schematic pump circuit view of a rotary distributor type fuel injection pump for use with a multi-cylinder engine, the pump having incorporated therein a solenoid actuated valve controlling fuel flow in series with the usual mechanical metering valve controlled inlet passage from a transfer pump to the injection pump element of the pump unit.
FIG. 2 is a schematic view of a rotary distributor type fuel injection pump similar to that of FIG. 1, but having incorporated therein a solenoid actuated valve controlled fuel passage, located in parallel with the usual mechanical metering valve, for controlling fuel flow through the inlet passage means connecting the transfer pump to the injection pump element of the pump unit.

Referring first to FIG. 1, the subject adaptive torque balance control mechanism of the invention is shown as being incorporated into an engine driven rotary distributor fuel injection pump 5, of a type similar to that disclosed, for example, in U.S. Pat. No. 3,861,833 entitled "Fuel Injection Pump" issued Jan. 21, 1975 to Daniel Salzgeber, Robert Raufeisen and Charles W. Davis, that is operative to supply pressurized fuel sequentially to a plurality of fuel injectors associated with the cylinders of an engine.

In the above-identified type pump, fuel from a supply tank 10 is delivered at a predetermined pressure, as a function of engine speed, from the outlet of an engine driven transfer pump 11 to an inlet supply passage 12 having a metering valve chamber 14 therein. A throttle lever, not shown, operator actuated and governor 15 controlled mechanical metering valve 16 is operatively positioned in the metering valve chamber 14, to provide a variable restriction whereby to control the flow of fuel through the downstream portion 17 of the supply passage 12 which is suitably connected in a known manner to a rotor passage 18 in the distributor rotor 20 whereby to supply fuel to the pump chamber 21a of the injection pump means 21 portion of the pump unit.

As schematically shown, the high pressure injection pump means 21 includes a pair of opposed reciprocating plungers 22, the movement of which is controlled by circumferentially spaced apart, inwardly directed cam lobes 23a on a cam ring 23. As is well known in the art, the cam ring 23 is mounted for limited angular movement in a circular bore of the pump housing 24.

As is conventional in this type pump, the rotor passage 18 sequentially registers with the passage portion 17 of the supply passage 12 as the distributor rotor 20 rotates at a time interval when the pump plungers 22 are free to move radially outward whereby the pump chamber 21a can be normally supplied with a charge of fuel as determined by the control setting of the metering valve 16. Continued rotation of the distributor rotor 20 interrupts the communication between the rotor passage 18 and the passage 17 and, then, when the pump plungers 22 operatively engage the rise of the cam lobes of cam ring 23, the pump plungers 22 are forced inwardly so as to pressurize the fuel contained in the pump chamber 21a to a high injection pressure.

The thus pressurized fuel in the pump chamber 21a is then delivered by the rotor passage 18 to one of a series of passages 24a, only one being shown, positioned in circumferentially spaced apart relationship to each other in the pump housing 24 around the distributor rotor 20 for sequential registry with the rotor passage 18, in a known manner, so as to effect the delivery of a charge of fuel from the pump chamber sequentially to the injection nozzles 25, only one being shown, that are associated with cylinders of the associated engine.

In a known manner, the outlet of the transfer pump 11 is also connected by a passage 26 to the inlet of a fuel chamber 27, the outlet of which is connected by a passage 28 so as to vent air and to supply fluid to the interior of the pump housing 24 whereby to provide for the lubrication of the various components of the pump mechanism mounted therein. The flow of fuel from the fuel chamber 27 out through the passage 28 is controlled by means of a vent wire assembly 30 in a manner known in the pump art.

Fuel thus supplied to the interior of the pump housing 24 for the lubrication of the pump elements is then returned via a return line 31 to the fuel tank 10. As shown, the fuel return line 31 has a pressure regulator 32 incorporated therein whereby the fuel within the pump housing can be maintained at a predetermined low pressure relative to the pressure of fuel as supplied by the transfer pump. This pressure within the pump housing is normally referred to as the housing pressure. Also, as shown, a spring biased pressure regulating valve 33 is provided to control the output from the transfer pump 11 to a predetermined maximum value, the return line from this valve returning fuel to the inlet side of the transfer pump downstream of a fuel filter 34, shown as being located downstream of a fuel supply pump 35.

To vary the timing of injection of the fuel into the associated cylinders of the engine, the cam ring 23 is rotated to adjust the angular position of the cam lobes thereon by means of a suitable automatic advance or timing control mechanism 36. A solenoid 37, operatively associated with the linkage member between the governor 15 and metering valve 16, is electrically operable to effect shut-off of the fuel metering valve 16 upon engine shut-down.

The pump unit 5 as thus far described and schematically shown is of a known conventional type as disclosed, for example, in the above-identified U.S. Pat. No. 3,861,833. Fuel injection pumps of this type and modifications thereof are presently used in certain commercially available diesel engine powered passenger vehicles. For a more detailed description of the above-identified pump components, reference is made to said U.S. Pat. No. 3,861,833 the disclosure of which is incorporated herein by reference thereto.

In a pump structure of the type thus far described, the amount of fuel supplied to the injection pump means 21 and thus to the respective injection nozzles 25 is normally regulated by fuel metering valve 16 which operates as a throttle valve to regulate fuel flow to the pump chamber 21a during each suction stroke cycle of the plungers 22.

However, in a fuel injection system of the type, for example, using such a fuel injection pump and nozzle arrangement whereby fuel is injected sequentially and substantially directly into the respective cylinders of a diesel engine, the fuel delivered during so-called steady state operating conditions may vary from cylinder-to-cylinder, resulting in speed variations among the cylinders. These variations may result from various operating variations such as, for example, variations in the injection pump, lines or in the injection nozzles. Other sources of the speed variation may include the compression or friction characteristics of one or more cylinders relative to other cylinders. As a result of such variations, for example, in the fuel being delivered to the various cylinders, a torque imbalance between cylinders exists which, particularly at lower RPM values, effects engine operation. In order to reduce idle RPM in the interest of economy and emissions, it is desirable to improve the torque balance of the engine.

For this purpose and in accordance with the invention, a solenoid actuated valve 40 is operatively associated with the inlet supply passage means 12 used to supply fuel to the injection pump means and, the operation of this solenoid actuated valve 40 is controlled by an adaptive torque balancing electronic control means in a manner to be described in detail hereinafter. In the construction shown, this valve 40 is a normally closed valve.

In the pump embodiment shown in FIG. 1, the solenoid actuated valve 40 is located in series with the portion of the inlet supply passage 12, having the metering chamber 14 and associate metering valve 16 therein, at a location upstream, in terms of the direction of fuel flow, from the metering valve 16. Accordingly, this pump embodiment 5 of FIG. 1 will hereinafter be referred to as the series pump embodiment.

An alternate embodiment of a rotary distributor injection pump, generally designated 5', in accordance with the invention is schematically shown in FIG. 2 wherein similar parts are designated by similar numerals but with the addition of a suffix (prime) where appropriate. In this alternate embodiment there is provided a secondary inlet supply passage 41 which has its upstream end, in terms of fuel flow, connected in fluid flow to the inlet supply passage 12 upstream of the metering chamber 14 and which has its opposite end connected to the supply passage 12 downstream of the metering chamber 14 as by being in fluid flow communication with the portion 17 of the supply passage 12, as shown.

In the construction of this embodiment, a normally closed solenoid actuated valve 40' is operatively positioned to control fuel flow through the secondary inlet supply passage 41 located in parallel with the metering valve 16. Accordingly, this pump 5' embodiment of FIG. 2 will hereinafter be referred to as the parallel pump embodiment.

Figure 3:
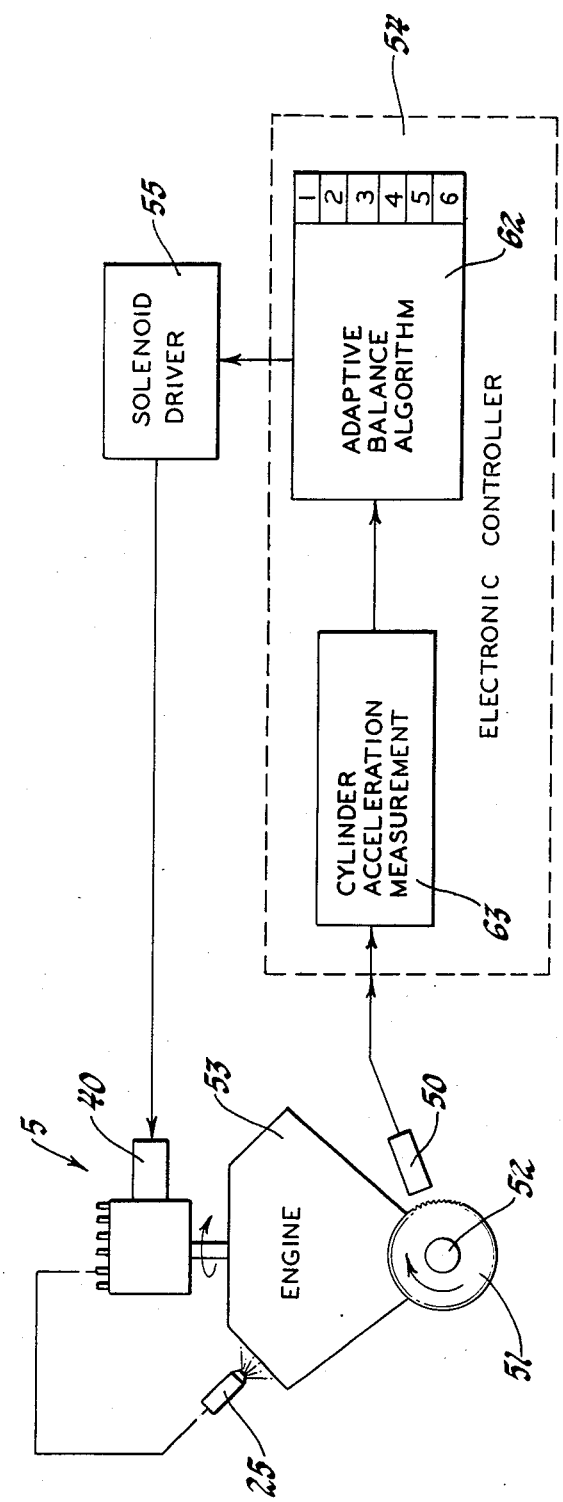
FIG. 3 is a schematic block diagram of an engine driven rotary distributor fuel injection pump with solenoid actuated valve and associate diesel engine and having an adaptive torque balancing electronic controlled electric power source connected to the solenoid actuated valve.

As best seen in FIG. 3, the solenoid actuated valve 40 or the series pump embodiment of FIG. 1 or 40' of the parallel pump embodiment of FIG. 2 is operatively connected to an adaptive torque balancing electronic controlled source of electrical power that is operative, in a manner to be described in detail hereinafter, whereby the solenoid actuated valve can be energized and deenergized, as desired, for a purpose to be described.

For this purpose and with reference to the embodiment of the control system shown in FIG. 3, a crankshaft position sensor, such as a magnetic pickup 50 is located adjacent to a toothed wheel 51, which, in the construction illustrated, is connected to the crankshaft 52 of an engine 53. This magnetic pickup 50 is used during engine operation to sense speed variations by the measurement of time intervals between a number of gear teeth on the wheel 51, that is, between preselected degrees of wheel 51 rotation, as desired, for each of the cylinders, not shown, of the engine. As is well known, each time interval between a preselected number of gear teeth is inversely proportional to speed.

In a typical application which has been used on an even firing V6 diesel engine (120 degrees between cylinder firings) the times were measured from TDC to 60 degrees ATDC and from 60 to 120 degrees ATDC. The difference between the two time measurements was used to infer the relative acceleration for each cylinder. It should be appreciated that the two measurement angular intervals need not be exactly equal, but that the angle intervals must be the same for all cylinders.

A high frequency oscillator and counter means, not shown, receives the pulses generated by the magnetic pickup 50 and is adapted to provide a cylinder speed measurement signal to a conventional electronic controller 54, for example, an onboard programmed digital computer. The electronic controller 54 is operative to provide signals to a solenoid driver 55 used to electrically power the solenoid valve 40.

Figure 5:
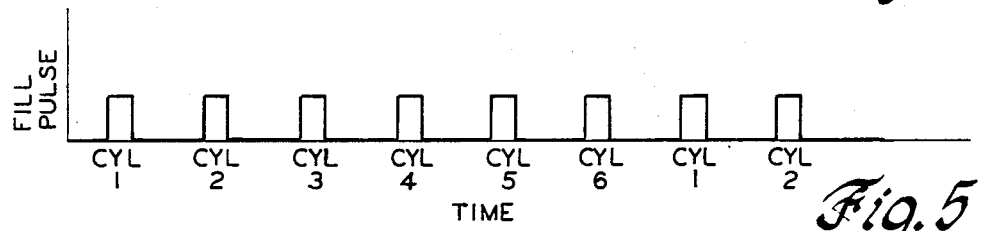
FIG. 5 is a diagram of the base pulse width signals that may be applied, in one embodiment to the solenoid actuated valve in the pump embodiment of FIG. 1.

Before describing the detailed function of the above, reference is first made to FIG. 5 wherein there is illustrated an example of a first embodiment power system wherein the base pulse width of the energization signal to the solenoid actuated valve 40 during each fill cycle of fuel delivery to the pump chamber 21a of the pump means 21 is a constant as for an injection pump 5 used to supply fuel to the cylinders of a 6-cylinder engine. With reference to the series pump embodiments of FIG. 1, this base pulse width, in a first program embodiment, is programmed to correspond to the fill time cycles of the injection pump so that the actual fuel delivery to the pump chamber 21a during each suction stroke of the plungers 22 is, in effect, controlled solely by the governor controlled fuel metering valve 16 in a normal manner for each of the 6 cylinders.

However, during the above described pump operation, when the fuel flow is controlled solely by the metering valve 16, as a result of the imbalances, for example, in the fuel supply system, the fuel delivered to each of the cylinders may vary from one another resulting in a variation in the torque output among the various cylinders. This torque imbalance results in detectable variations in the speeds among various cylinders as shown in FIG. 4.

Figure 4:
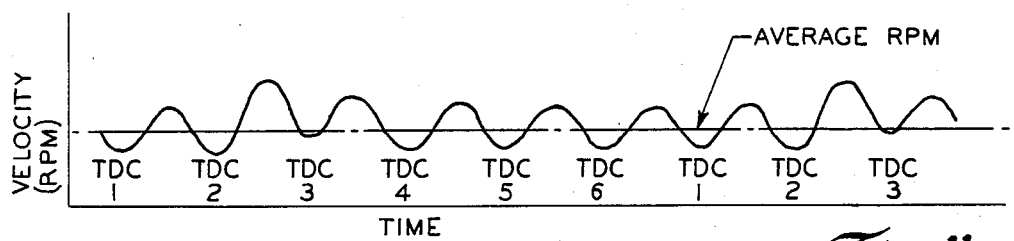
FIG. 4 is a graph of the cylinder RPM speed variations of a 6-cylinder engine at various time intervals, the approximate top dead center (TDC) position of the respective cylinders of the engine being shown.

In the FIG. 4 illustrative example, the cylinder speeds are shown, as for a 6-cylinder diesel engine, with again, by way of an example, the speeds of cylinders 1, 3, 4, 5 and 6 shown as being substantially uniform and the speed of cylinder 2 illustrated as being greater than that of the remaining cylinders. This FIG. 4 illustrates graphically, the speeds of the cylinders as the associate piston therein moves toward and away from its top dead center position in each cylinder. Thus with reference to this example, the speeds and accordingly the torque output from each of cylinders 1, 3, 4, 5 and 6 is substantially equal, whereas that of cylinder 2 is shown graphically as being greater than that of the remaining cylinders and accordingly greater than the average of all cylinders.

In the embodiment disclosed, the relative cylinder acceleration is inferred by measuring the time difference for two approximately equal, angular intervals between combustion events. The approach which has been used, for example, on an even firing V6 diesel engine (120 degrees between cylinder firings) was to measure the time from TDC to 60 degrees ATDC and from 60 to 120 degrees ATDC. The difference between the two time measurements is used to infer the relative acceleration for each cylinder. The average time difference of all the cylinder measurements is calculated and used to remove any bias factors due to overall engine acceleration or location of the measurement angle intervals on the crankshaft speed waveform. The cylinder relative acceleration is then calculated based on the time difference and the average of the time difference measurements.

Relative
Cylinder$_i$Acceleration $\approx (T_1 - T_2)$ - Average $(T_1 - T_2)$ $T_1$ Time for an initial portion of the angle interval between combustion events for cylinder$_i$ and cylinder$_{i+1}$ (typically TDC to 60 DEG ATDC for a six cylinder)

$T_2$ Time for a later portion of the angle interval between combustion events for cylinder$_i$ and cylinder$_{i+1}$ (typically 60 to 120 DEG ATDC for a six cylinder)

Test results indicate that the two measurement angular intervals do not have to be exactly equal in order to improve engine smoothness, but the angle intervals must be the same for all cylinders.

Figure 7:
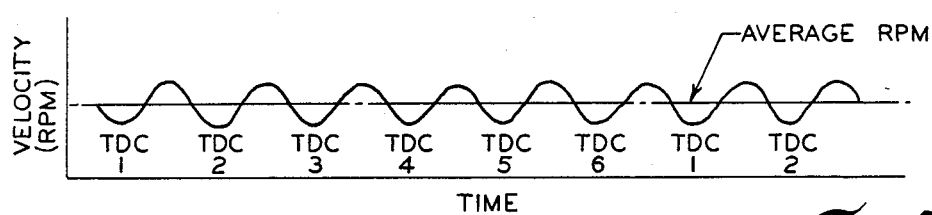
FIG. 7 is a graph similar to that of FIG. 5 but with substantially balanced cylinder speeds indicating substantially uniform torque output from each of the cylinders.
Figure 8:
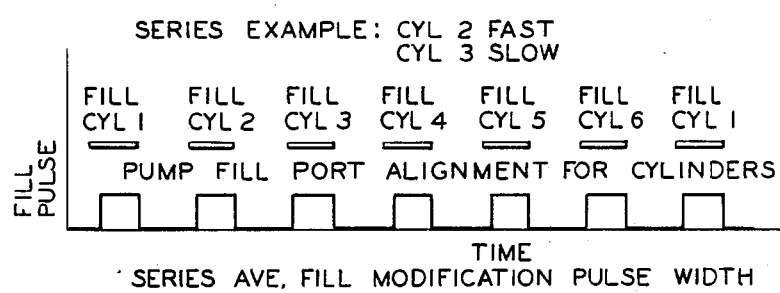
FIGS. 8 and 8a are graphs of an average, constant modified pulse signal applied to the solenoid actuated valve of the pump embodiment of FIG. 1 and of this signal modified by positive and negative fuel fill modifiers, respectively.

Now if this torque imbalance exists repeatably for a predetermined period of time, as desired, this torque imbalance is adjusted by modifying the base pulse width signal to the solenoid actuated valve 40 during the fill stroke of the plungers 22 for injection to the injection nozzle 25 associated with cylinder 2, in small increments until a pulse width is established, as shown in FIG. 7, at which the speed associated with cylinder 2 corresponds substantially to that of the remaining cylinders, as shown in FIG. 8, at which time the torque output of each of the cylinders is substantially equal.

By reducing the pulse width of the signal energizing the solenoid actuated valve 40, fuel flow from the transfer pump 11 via inlet supply passage 12 to the metering valve chamber 14 is blocked during a portion of the time interval during the associated fill cycle of the injection pump means 21. Accordingly, the amount of fuel that can be delivered by the throttling action of the fuel metering valve 16 is accordingly reduced in direct relation to the shortened time interval during which it is being supplied with fuel. This modification of the pulse width signal to the solenoid actuated valve for the fill cycle for cylinder 2 is graphically shown in FIG. 6.

Thus to compensate for the torque imbalance of cylinder 2, relative to cylinders 1, 3, 4, 5 and 6, in this example and with reference to the block diagram of one embodiment of the electronic controller 54 shown in FIG. 3, the base pulse width provided via solenoid driver 55 to the solenoid actuated valve 40 trimmed by an adaptive modifier in an adaptive controller 62 having a memory associated with each associated operative cycle of the solenoid actuated valve 40 for each of the cylinders of the associate engine 53.

The adaptive fuel fill modifier for each respective cylinder, as necessary, is derived, in the embodiment described, as a function of the speed variation of a given cylinder during its power stroke compared to the average of all of the cylinders. For example, in the above described and illustrated example, the speed measurement of cylinder 2, as measured by the speed signal circuit 63, which receives signals from the magnetic pickup 50, compared to the running average of all of the cylinders is above average indicating a greater than average torque being produced by that cylinder. Accordingly, a fuel fill modifier to subtract an increment from the normal pulse width will be stored in the memory of the circuit of the controller 54 for the cylinder 2 fill cycle.

The fuel modifier for one or more cylinders can be calculated using an integral computation based on the relative acceleration inferred by the relative time difference calculation. The cylinder fuel modifier calculation is then:

New
Fuel Modifier =
Cylinder$_i$

-continued

Old
Fuel Modifier + $K_1 \cdot [(T_1 - T_2)_i - \text{Average}(T_1 - T_2)]$
Cylinder$_i$ (Incremental Change in Fuel Modifier/Cycle)

The fuel modifier for each cylinder is calculated once per engine cycle based on the latest time difference and average time difference values. The $K_1$ term is the integral gain factor which establishes the sensitivity of the fuel modifier calculation to the time difference and also the rate at which the modifier can change. The rate of modifier change can also be controlled by limiting the amount of incremental change in the fuel modifiers each engine cycle. The rate of fuel modifier change per engine cycle is generally a small fraction of the total fuel modifier range, since the control program should be designed to correct for the slowly changing factors which cause speed variation. The average time difference in the above equation is calculated using a digital filter routine.

Figure 6:
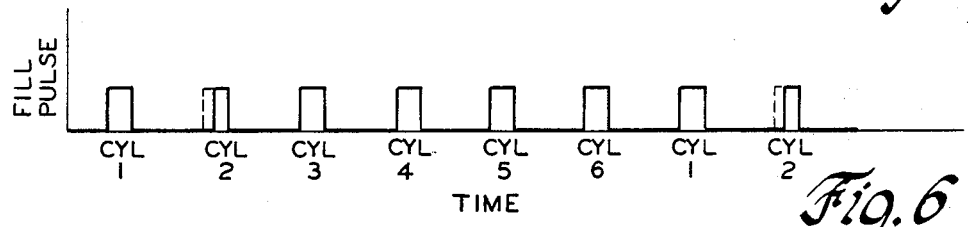
FIG. 6 is a diagram similar to that of FIG. 5 but showing a modified pulse width for the cylinder 2 cycles.

As shown in FIG. 6, on the next fill cycle, the solenoid actuated valve 40 will receive a reduced pulse width signal resulting in the fuel being supplied to the pumping means 21 and therefor to the injection nozzle 25 associated with cylinder 2 being reduced, making it possibly, for example, more equal to the fuel being supplied to the remaining cylinders. This adaptive torque balancing process continues in a similar manner for all cylinders, as necessary, for all speed and loads up to some predetermined value, resulting in a substantially balanced system with substantially uniform torque output as shown in FIG. 7. At a preselected relatively higher speed, fill modification can be phased out because of the normally more smooth engine operation at such higher speeds. Thus at high speeds, the solenoid actuated valve 40 may be constantly energized to hold this valve open.

As is known in the art, random perturbations can be expected in the system and can be separated from the cyclic variations by known deadband and digital filtering techniques.

The adaptive torque control pump system thus far described with reference to the series pump embodiment of FIG. 1 operates, in effect, in a fuel substractive mode whereby the fuel quantity delivered to one or more cylinders operating at higher relative speeds than the other cylinder is reduced, as necessary, so as to adjust the speed and therefore the torque output of each of those cylinders substantially to that of the remaining cylinders so that all of the cylinders produce substantially uniform torque output.

In the above described parallel pump arrangement of FIG. 2 wherein the solenoid actuated valve 40' is located to control fuel flow through a secondary inlet supply passage 41 which is positioned in parallel with the metering valve 16 in the supply passage 12, the metering valve 16 in a first program embodiment, is also operative to normally control the primary supply of metered fuel to the injection pump means 21. The solenoid actuated valve 40', in this parallel pump embodiment can then be operated so as to provide for the additional fuel flow to the injection pump means 21 for discharge to a given engine cylinder or cylinders, as needed and as determined by their lower speeds relative to the remaining cylinder, whereby to substantially equalize the speeds of the various cylinders and therefor their torque output. This alternate parallel pump embodiment and associate adaptive torque electronic controlled power source operates, in effect, in a fuel additive mode, whereby the fuel quantity delivered to one or more cylinders can then be increased as necessary so as to, in effect, substantially adjust the torque output of those cylinders to that of the remaining cylinders so that all of the cylinders of the engine provide substantially uniform torque output.

Again referring to the above-described example shown in FIG. 4 of the 6-cylinder engine wherein cylinders 1, 3, 4, 5 and 6 are operating so as to provide substantially uniform torque output, while the speed signal for cylinder 2 indicates a higher than average torque output.

It should now be apparent to those skilled in the art that in the additive pump system of the parallel pump embodiment of FIG. 2 embodiment, fuel correction modifier pulses can be applied, for example, to the solenoid actuated valve 40' during the fill cycles for cylinders 1, 3, 4, 5 and 6 whereby to increase the torque output of these cylinders to substantially that produced by cylinder 2.

Thus with regard to the pump embodiments and operational embodiment shown and described, in the series pump embodiment of FIG. 1, fuel is subtracted from the cylinder or cylinders whose speeds are above the average while, in the parallel pump embodiment of FIG. 2, fuel is added to the cylinder or cylinders whose speed are less than the average of all of the cylinders of the engine.

However, since normally in production diesel engines, the speed of one or more cylinders may be above and that one or more cylinders may be below the average speed of all cylinders of the engine, in a preferred adaptive torque control system an average modified pulse width signal is applied to the solenoid actuated valve 40 of the series pump embodiment of FIG. 1 or to the valve 40' of the parallel pump embodiment of FIG. 2.

Accordingly, the electronic controller is programmed so as to set an average fill modification pulse width signal, that is a pulse width signal over a predetermined fill angle of fill port alignment for each cylinder during rotation of the pump distributor rotor, (reduced fill for the series pump embodiment of FIG. 1, increased fill for the parallel pump embodiment of FIG. 2) and then to add positive and negative fuel quantity fill modifiers, as necessary, to smooth out engine operation. Preferably, the average of the fill modifiers would be set equal to zero in order to minimize idle speed changes with changes in the modifiers. At higher speeds, the average fill modification and the modifiers can be phased out since at higher speeds the smooth out of engine operation is normally not required.

Thus as best seen with reference to FIG. 8, for the series pump embodiment of FIG. 1, an average fill modified pulse width signal is applied to the solenoid actuated valve 40 so that its energization is delayed by a predetermined constant average delay-to-fill modification angle relative to the fill port alignment for all of the engine cylinders with which the pump 5 is associated, 6 cylinders in the example shown. It will be appreciated that since this constant average delay-to-fill modification will normally reduce the fuel quantity delivered to all cylinders, the fuel metering valve 16 would be adjusted initially by the usual idle adjusting screw, not shown, to a rotative position supplying more fuel at idle to compensate for the average shorter pulse width signal applied to the solenoid actuated valve.

Figure 8A:
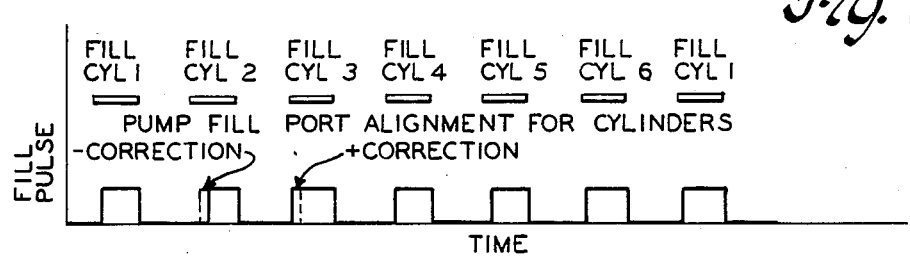

With such an average modified pulse signal available, it is then possible to now add positive and negative fuel quantity fill modifiers, as shown in FIG. 8a, whereby to increase or decrease, respectively, the fuel quantity modifiers for those cylinders that are below or above average speed i.e., cylinders 3 and 2 in the example shown, whereby their torque output will then be substantially equal to that of the remaining cylinders.

Figure 9:
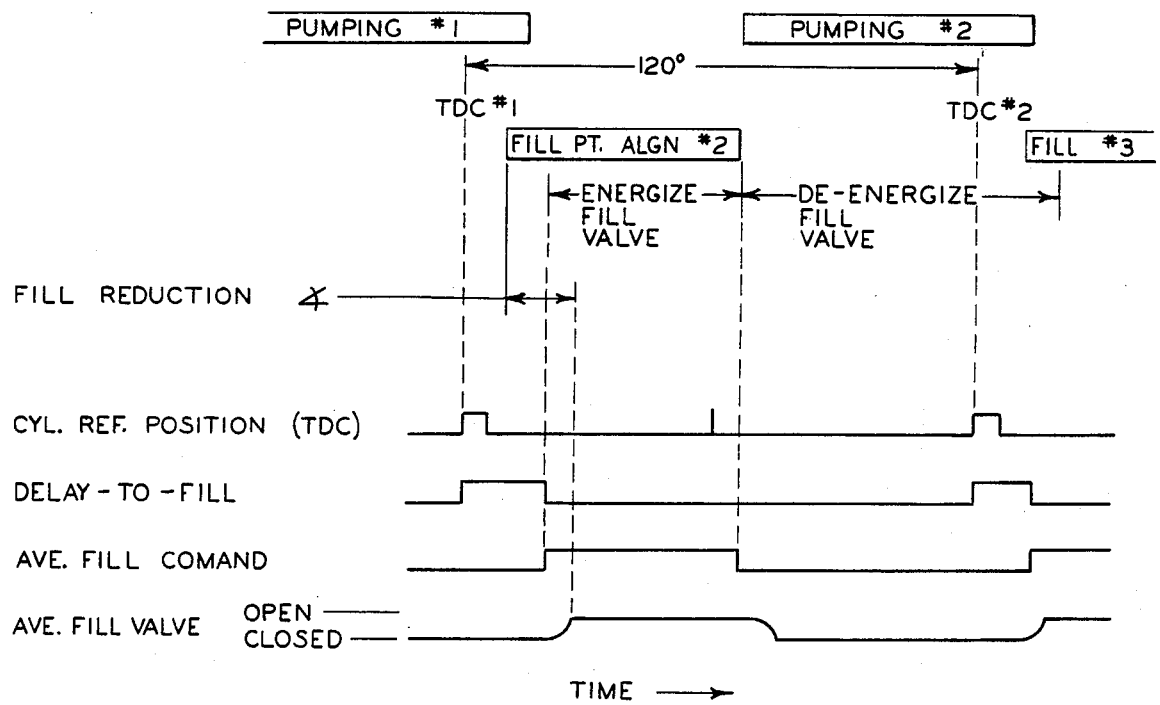
FIG. 9 is an adaptive cylinder balance functional diagram showing, by way of example, how the fuel reduction to the cylinder 2 of an engine is obtained in the fuel pump embodiment of FIG. 1 by a negative fill modifier as shown in FIG. 8a; and, FIGS. 10 and 10a are graphs similar to those of FIGS. 8 and 8a, respectively but applicable to actuation of the solenoid actuated valve of the pump embodiment of FIG. 2.

With reference to FIG. 9 there is illustrated graphically how the average fill command pulse width signal is of reduced width relative to the time interval that the pump fill port for cylinder 2, for example, is in alignment. The actual delay-to-fill angle during which the solenoid actuated valve 40 remains deenergized for the various cylinders can be programmed by the controller 54 provided with the adaptive torque balancing algorithm shown in this Figure. Thus as shown in FIG. 9 with reference to the above example in FIG. 8, a negative fill modification signal as computed by the equation 2 of FIG. 9 has been added to the average, constant fill delay signal so that, in effect, the pulse width signal applied for cylinder 2 fill is reduced so that the pump 5 will supply less fuel to this cylinder.

Of course the plus fill modifier, as for example cylinder 3, when added to the constant fill delay signal will increase the pulse width signal accordingly so that the pump 5 will supply more fuel to that cylinder.

Figure 10:
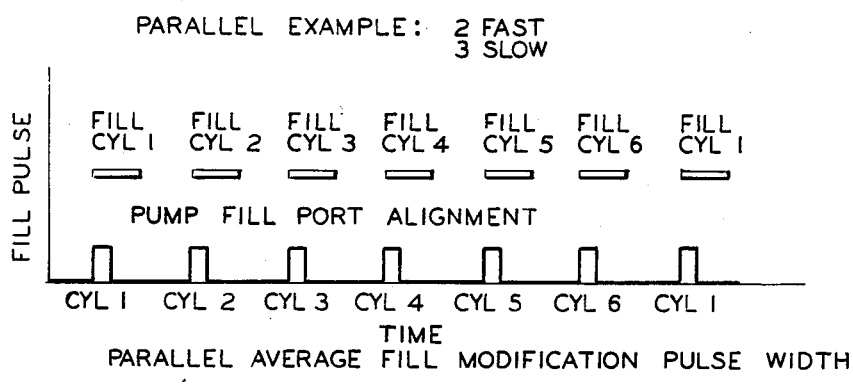
Figure 10A:
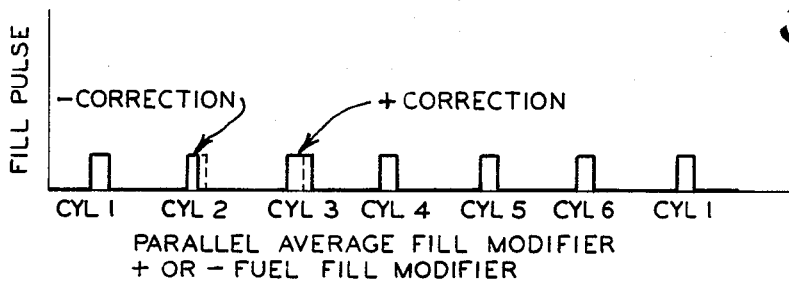

For the same purpose, a relatively small, average constant fill modification pulse width signal can be programmed so as to be applied to the solenoid actuated valve 40' of the parallel pump embodiment of FIG. 2 so that a small quantity of additional fuel will be programmed to be supplied to the injection pump means 21 for all cylinders of the engine as shown in FIG. 10.

In order to compensate for this programmed added fuel being supplied to all cylinders, the fuel metering valve 16, in this case, would be adjusted by the usual idle adjusting screw, not shown, to a rotative position at which it would supply less fuel at idle, as desired, so as to adjust for the added fuel supplied via the valve 40' and secondary passage 41 to the injection pump means 21 because of the above-described fill modification pulse.

With the use of such an average fill modification pulse width signal, it is then possible to add positive and negative fuel quantity fill modifiers, as shown in FIG. 11b, whereby to increase or decrease the fuel quantity modifiers for those cylinders below or above average speed, i.e., cylinders 3 and 2 in the example shown, whereby the torque output of those cylinders will then be substantially equal to that of the other cylinders.

The range of authority for the pulse width control is preferably limited to, for example, plus and minus 20% of the base pulse width, that is, of the average, constant fill modification pulse width. Additionally, the authority is preferably limited so as to restrict pulse corrections during normal transient maneuvers.

As should now be apparent to those skilled in the art, fuel flow to the valve chamber 14 in the series embodiment of FIG. 1, for example, can be blocked either at the start of the fill cycle as shown and described with reference to FIGS. 7 and 10, or, alternatively, it can be blocked, if desired, toward the end of a fill cycle by the deenergization of the solenoid actuated valve prior to the otherwise normal end of the pulse width signal.

Thus for the otherwise conventional rotary distributor fuel injection pump, there has been disclosed herein two arrangements for modifying the fuel quantity, as needed, so as to modify cylinder speed and thus torque output whereby to provide for substantially uniform torque output from all of the cylinders of the engine.

Thus in the series pump embodiment of FIG. 1, the normally closed solenoid actuated valve 40 is placed in series with an upstream of the normal metering valve 16, in which case fuel is selectively reduced or increased, as needed for one or more cylinders by reducing or increasing the pulse width signal to the solenoid actuated valve 40. It should be noted that since this valve 40 is a normally closed valve and if it is located upstream of the metering valve 16 in series therewith, it is also operative as a fuel shut-off valve upon shut-down of engine operation.

In the parallel pump embodiment of FIG. 8, the solenoid actuated valve 40' is in position to control flow through a secondary supply passage 41 located in parallel with the metering valve 16 controlled primary supply passage 12 whereby the fuel supply can be selectively reduced or increased, as needed.

In either case, it is preferable to set an average fill modification value, (reduced fill for the series embodiment, increased fill for the parallel embodiment) and then to add negative or positive, respectively, fuel quantity modifiers to those cylinders that are non-average so as to smooth out engine operation by providing for the substantially torque output from all of the cylinders.

As previously described, the average of the positive and negative fuel fill modifiers should be set equal to zero in order to minimize idle speed changes with changes in these modifiers. Thus, in a particular 6-cylinder engine, if for example, the speed of cylinder 2 was above and that of cylinder 3 below the average of all cylinders so that an excessively large negative correction signal was required for cylinder 2 and only a small positive signal was required for cylinder 3, an additional small positive signal could then be applied to cylinder 3 plus cylinders 1, 4, 5 and 6, as necessary, whereby the average of these negative and positive fill modification signals can be set to zero.

With this program arrangement, these fill modification signals can be gradually phased out with increasing engine speeds so as to taper out the transition from adaptive torque balancing control of the engine at idle to some predetermined high speed operation of the engine and thus prevent a sudden surge in engine operation.

While the invention has been described with reference to the particular embodiments disclosed herein, it is not confined to the details set forth since it is apparent that various modifications can be made by those skilled in the art without departing from the scope of the invention. For example, although in the constructions shown, the solenoid actuated valves are of the normally closed type, it should be apparent that normally open type valves could be used and that, in the series pump embodiment, the solenoid actuated valve could also be located downstream of the metering valve, if desired. In addition, although the pump embodiments have been described as being operative so as to substantially balance the contributions of individual cylinders of an engine, they would also be operable, if desired, to intentionally effect unbalance of the contributions of individual cylinders, for example, to increase exhaust temperatures of cylinders discharging exhaust gases through a particulate trap, or for emission or noise control under certain conditions. This application is therefore intended to cover such modifications or changes as may come within the purposes of the invention as defined by the following claims.

The embodiments of the invention in which an exclusive property or privilege is claimed are defined as follows:

1. In an engine driven distributor type fuel injection pump and diesel engine combination, with the pump including a housing means with an injection pump means and distributor means therein for sequentially supplying pressurized fuel via discharge passage means to a plurality of injection nozzles associated with the cylinders of the associate engine, a transfer pump for supplying fuel via inlet passage means to the injection pump means and, a governor controlled, mechanical metering valve operatively positioned in the inlet passage means for normally controlling fuel flow to the injection pump means, the improvement comprising: a solenoid actuated valve means operatively associated with said inlet passage means in a position between said transfer pump and said injection pump means; and, an adaptive torque balancing electronic controlled electric power source connected to said solenoid actuated valve means, whereby said solenoid actuated valve means is operative to supplement the metering valve control of fuel flow from said transfer pump to said injection pump means so that the fuel flow to the injection pump means and from the injection pump means to each of the respective injection nozzles for each of the cylinders is controlled as a function of engine operation and the incremental speed difference per preselected degrees of movement among the respective cylinders of the engine.

2. In an engine driven distributor type fuel injection pump and diesel engine combination wherein the pump includes a housing means with an injection pump means and distributor means therein for sequentially supplying pressurized fuel via discharge passage means to a plurality of injection nozzles associated with the cylinders of the associate engine, a transfer pump for supplying fuel via inlet passage means to the injection pump means and, a governor controlled, mechanical metering valve operatively positioned in the inlet passage means for normally controlling fuel flow to the injection pump means, the improvement comprising: a solenoid actuated valve means operatively associated with said inlet passage means in a series position between said transfer pump and said injection pump means; and, an adaptive torque balancing electronic controlled electric power source connected to said solenoid actuated valve means, said adaptive torque balancing electronic controlled electric power source including speed sensing means operatively associated with the engine to measure the effective speeds of the cylinders of the engine whereby said adaptive torque balancing electronic controlled electric power source is operative to energize said solenoid actuated valve means so as to supplement the metering valve control of fuel flow from said transfer pump to said injection pump means so that the fuel flow to the injection pump means and from the injection pump means to each of the respective injection nozzles for each of the cylinders is controlled as a function of the incremental speed difference per preselected degrees of movement among the respective cylinders of the engine over a predetermined range of engine operation whereby in said range the torque outputs of the cylinders of the engine are substantially equal.

3. In a fuel supply system including an engine driven distributor type fuel injection pump operatively connected to a multi-cylinder diesel engine, said pump having a housing means with an injection pump means and distributor means therein for sequentially supplying pressurized fuel via discharge passage means to a plurality of injection nozzles and a transfer pump for supplying fuel via an inlet passage means to the injection pump means and, a governor controlled, mechanical, fuel metering valve operatively positioned in the inlet passage means for normally controlling fuel flow to the injection pump means, the improvement comprising: a secondary inlet passage means connected to said inlet passage means with one end upstream and the opposite end downstream of said metering valve, in terms relative to the direction of fuel flow, whereby to define an inlet flow passage in parallel with the metering valve; a solenoid actuated valve means operatively associated with said secondary inlet passage means; and, an adaptive torque balancing electronic controlled electrical power source connected to said solenoid actuated valve means whereby said solenoid actuated valve means is operative to control the flow of additional fuel through said secondary inlet passage means to the injection pump means in addition to that normally supplied by operation of the metering valve.

4. In an engine driven distributor type diesel fuel injection pump having a housing means with an injection pump means and distributor means therein for sequentially supplying pressurized fuel via discharge passage means to a plurality of injection nozzles associated with the cylinder of an associate engine, and a transfer pump for supplying fuel via inlet passage means to the injection pump means and, a governor controlled, mechanical metering valve operatively positioned in the inlet passage means for controlling fuel flow to the injection pump means, the improvement comprising: a solenoid actuated valve means operatively associated with said inlet passage means in a position between said transfer pump and said injection pump means, an electronic controlled electric power source connected to said solenoid actuated valve means, whereby said solenoid actuated valve means is operative to supplement the metering valve control of fuel flow from said transfer pump to said injection pump means whereby the fuel flow to the injection pump means and from the injection pump means to the respective injectors for each of the cylinders is controlled, said electronic controlled electric power source including means to provide signals relative to the time differences between combustion events in the respective cylinders and means to calibrate a fuel modifier signal based on cylinder speed differences which is used to control the electrical signal to said solenoid actuated valve means in accordance with the algorithm:

New Fuel Modifier =
Cylinder$_i$
    Old Fuel Modifier + $K_1$ [$(T1 - T2)_i$ − Average $(T1 - T2)$]
Cylinder$_i$ wherein:
$T_1$ = Time for an initial portion of the angle interval between combustion events for cylinder$_i$ and cylinder$_{i+1}$;
$T_2$ = Time for a later portion of the angle interval between combustion events for cylinder$_i$ and cylinder$_{i+1}$; and,
$K_1$ = A preselected integral gain factor.

5. In an engine driven distributor type fuel injection pump and diesel engine combination, wherein the injection pump includes a housing means with an injection pump means and distributor means therein for sequentially supplying pressurized fuel via discharge passage means to a plurality of injection nozzles associated with the cylinders of the associate engine, a transfer pump for supplying fuel via inlet passage means to the injection pump means and, a governor controlled, mechanical metering valve operatively positioned with the inlet passage means for normally controlling fuel flow to the injection pump means, the improvement comprising a solenoid actuated valve means operatively associated with said inlet passage means in a position between said transfer pump and said injection pump means; and, an electronic controlled electric power source connected to said solenoid actuated valve means, whereby said solenoid actuated valve means is pulsed once per pumping cycle of said injection pump means whereby to provide an inlet metering trim to the metering valve control of fuel flow from said transfer pump to said injection pump means so that the fuel flow to the injection pump means and from the injection pump means to each of the respective injection nozzles for each of the cylinders is controlled as a function of engine operation.

* * * * *